(12) United States Patent
Berberian

(10) Patent No.: US 9,277,132 B2
(45) Date of Patent: Mar. 1, 2016

(54) IMAGE DISTORTION CORRECTION OF A CAMERA WITH A ROLLING SHUTTER

(71) Applicant: Mobileye Technologies Limited, Nicosia (CY)

(72) Inventor: Yael Berberian, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 0 days.

(21) Appl. No.: 14/185,217

(22) Filed: Feb. 20, 2014

(65) Prior Publication Data

US 2014/0232887 A1 Aug. 21, 2014

Related U.S. Application Data

(60) Provisional application No. 61/767,332, filed on Feb. 21, 2013.

(51) Int. Cl.
*H04N 5/228* (2006.01)
*H04N 5/232* (2006.01)

(52) U.S. Cl.
CPC ......... *H04N 5/2329* (2013.01); *H04N 5/23248* (2013.01)

(58) Field of Classification Search
CPC .... H04N 5/2329; H04N 5/3532; H04N 5/353
See application file for complete search history.

(56) References Cited

U.S. PATENT DOCUMENTS

| | | | |
|---|---|---|---|
| 7,844,134 B2 * | 11/2010 | Sasaki et al. | 382/295 |
| 8,169,519 B1 * | 5/2012 | McClatchie | 348/294 |
| 8,456,517 B2 | 6/2013 | Spektor et al. | |
| 8,488,895 B2 | 7/2013 | Muller et al. | |
| 8,643,752 B1 * | 2/2014 | McClatchie | 348/294 |
| 8,744,169 B2 * | 6/2014 | Othmezouri et al. | 382/154 |
| 8,786,716 B2 * | 7/2014 | Zhou | 348/208.4 |
| 8,913,140 B2 * | 12/2014 | Zhou | 348/208.4 |
| 2005/0111698 A1 * | 5/2005 | Kawai | 382/103 |

(Continued)

FOREIGN PATENT DOCUMENTS

WO 2012175703 A1 12/2012
WO 2013151873 A1 10/2013

OTHER PUBLICATIONS

"Computer Vision on Rolling Shutter Cameras Part II: Rolling Shutter Geometry Computer", Vision Laboratory Dept. of Electrical Engineering Linköping University, Per-Erik Forssen, Jun. 16-21, 2012.

(Continued)

*Primary Examiner* — Nicholas Giles
(74) *Attorney, Agent, or Firm* — The Law Office of Michael E. Kondoudis

(57) ABSTRACT

Correcting image distortion during camera motion using a system including a processor and a camera having a rolling shutter. Multiple image frames are captured by the camera equipped with the rolling shutter. The captured image frames include a base image frame and a previous image frame. Multiple time stamps are recorded respectively for multiple corresponding image points in the previous and base image frames. For the corresponding image points, multiple ego-motions are computed responsive to the time stamps of the corresponding image points of the base image frame and the previous image frame to correct the image distortion caused by the rolling shutter.

14 Claims, 2 Drawing Sheets

(56) References Cited

U.S. PATENT DOCUMENTS

| | | | |
|---|---|---|---|
| 2005/0140670 A1* | 6/2005 | Wu et al. | 345/419 |
| 2007/0120997 A1* | 5/2007 | Sasaki et al. | 348/362 |
| 2011/0074927 A1* | 3/2011 | Perng et al. | 348/46 |
| 2012/0308114 A1* | 12/2012 | Othmezouri et al. | 382/154 |
| 2013/0044230 A1* | 2/2013 | Zhou | 348/208.6 |
| 2013/0044241 A1* | 2/2013 | Zhou | 348/241 |

OTHER PUBLICATIONS

Hedborg, Johan, et al. "Structure and motion estimation from rolling shutter video." Computer Vision Workshops (ICCV Workshops), 2011 IEEE International Conference on. IEEE, 2011.

Christopher Geyer. "Geometric models of rolling-shutter cameras." arXiv preprint cs/0503076 (2005).

Hanning, Gustav, et al. "Stabilizing cell phone video using inertial measurement sensors." Computer Vision Workshops (ICCV Workshops), 2011 IEEE International Conference on. IEEE, 2011.

Hedborg, Johan, et al. "Rolling shutter bundle adjustment." Computer Vision and Pattern Recognition (CVPR), 2012 IEEE Conference on. IEEE, 2012.

Klinger, Bryan. "Street View Motion-from-Structure-from-Motion.".

Oth, L. (Jun. 2013). Rolling Shutter Camera Calibration. In Computer Vision and Pattern Recognition (CVPR), 2013 IEEE Conference on (pp. 1360-1367). IEEE.

* cited by examiner

IMAGE DISTORTION CORRECTION OF A CAMERA WITH A ROLLING SHUTTER

CROSS REFERENCE TO RELATED APPLICATIONS

The present application claims priority from U.S. provisional patent application 61/767,332 filed on 21 Feb. 2013 by the same inventor, the disclosure of which is included herein by reference.

BACKGROUND

1. Technical Field

The present disclosure relates to correction for distortions arising from use of a rolling shutter, and more particularly for use in a camera based driver assistance/control system.

2. Description of Related Art

Rolling shutter is a method of image acquisition in which each frame is recorded not from a snapshot of a single point in time, but rather by scanning across the image frame, for instance row by row. With a rolling shutter, not all parts of the image are recorded at exactly the same time, even though the whole frame may be displayed at the same time during playback. The rolling shutter is in contrast with a global shutter where the entire frame is exposed for the same time window.

Ego-motion "self-motion" refers to the translation and orientation (e.g. yaw, pitch and roll) in time of moving camera. A measure of ego-motion or of the camera mounted in a vehicle is important for driver assistance and/or vehicle control systems in order to accurately detect, recognize and avoid false positive detections of: other vehicles, obstacles, lights, street signs, lane markers and/or guard rails in the road environment.

Structure-from-Motion (SfM) refers to methods for recovering three-dimensional information of a scene that has been projected onto the focal plane(s) of a moving camera or multiple cameras. The structural information derived from a SfM algorithm may take the form of a set of projection matrices, one projection matrix per image frame, representing the relationship between a specific two-dimensional point in the image plane and its corresponding three-dimensional point. SfM algorithms rely on tracking specific image features from image frame to image frame to determine structural information concerning the scene.

BRIEF SUMMARY

Various systems and methods are disclosed herein for correcting image distortion during camera motion using a system including a processor and a camera having a rolling shutter. Multiple image frames are captured by the camera equipped with the rolling shutter. The captured image frames include a base image frame and a previous image frame. Multiple time stamps are recorded respectively for multiple corresponding image points in the previous and base image frames. For the corresponding image points, multiple ego-motions are computed responsive to the time stamps or capture times of the corresponding image points of the base image frame and the previous image frame to correct the image distortion caused by the rolling shutter. The computation of the ego-motions may be performed using image data from the image frames of the camera. The corresponding image points of the base image frame and the previous image frame are image points of the same object point. The computation of the ego-motions may be responsive to the time stamp difference between the corresponding image points. Image disparities may be computed based on the ego-motions. Distance to an object being imaged may be computed based on the ego-motions. The ego-motions may be determined by using an iterative process wherein an optimization goal is to minimize the distances between the epipolar lines corresponding to the image points in the previous image and the matching image points in the base image.

BRIEF DESCRIPTION OF THE DRAWINGS

The invention is herein described, by way of example only, with reference to the accompanying drawings, wherein.

Figure 1:
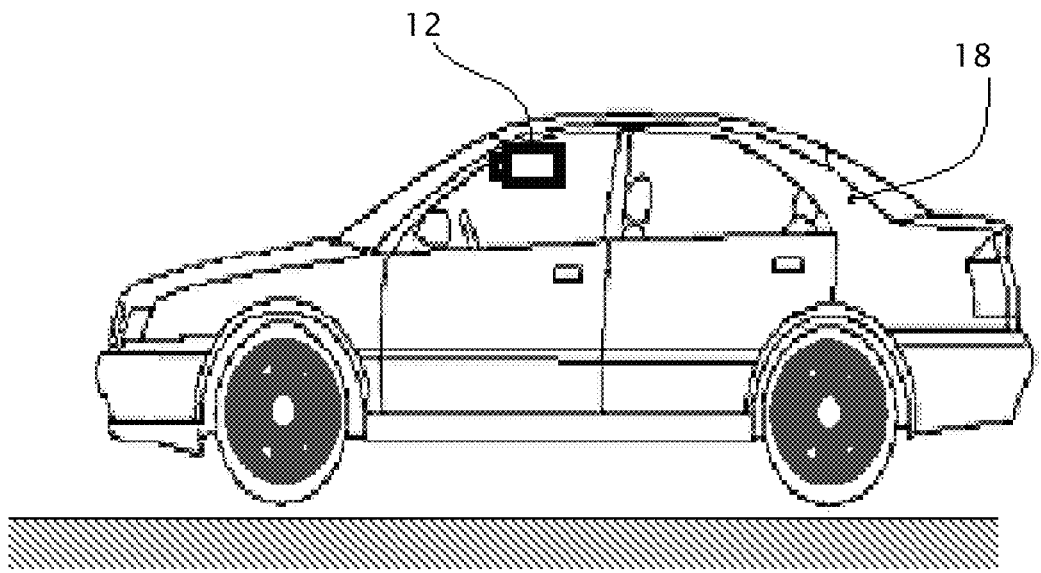
FIGS. 1 and 2 illustrate a system including a camera with a rolling shutter mountable in a vehicle, according to an aspect of the present invention.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The embodiments are described below to explain the present invention by referring to the figures.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, embodiments of the present invention are based on ego-motion computations from the image data of a moving camera. When ego-motion computations are available as in driver assistance systems and/or vehicle control systems, computational resources may be saved by using the available ego-motion information. By way of example, a structure from motion (SfM) algorithm may use an ego motion matrix C which describes the ego-motion of a camera moving in real space while capturing a pair of image frames ("base" and "previous"). The SfM algorithm may use the ego motion matrix C and image point correspondences between the pair of image frames to calculate real space distances to objects being imaged. Such an ego motion matrix C describes the camera motion while capturing two image frames in which all pixels of each image frame are sampled at the same time. A rolling shutter renders the use of a single ego motion matrix C inadequate, as the motion of the camera is different for each pair of corresponding image points. Therefore, in order to fully describe the motion of the camera between two image frames, as many ego motion matrix matrices C are required as the number of corresponding pixel pairs. Such an approach would be computationally prohibitive for use in driver assistance and control systems which are required to respond in real time.

However, assuming that the ego motion matrix C between points sampled at time t=0 is known, and that the characteristics of the camera motion did not change considerably between the two image frames, the timestamps between rows may be used to compute the real ego motion between capture times of image points. In practice, because of various other distortions the captured image undergoes (e.g. distortion from optical system and/or camera calibration distortion), a different time stamp for each pixel may be obtained and used rather than a time stamp per row. In this way, the other distortions may be considered in addition to the rolling shutter distortion by adjusting the time stamp according to the known distortion per pixel.

Figure 2:
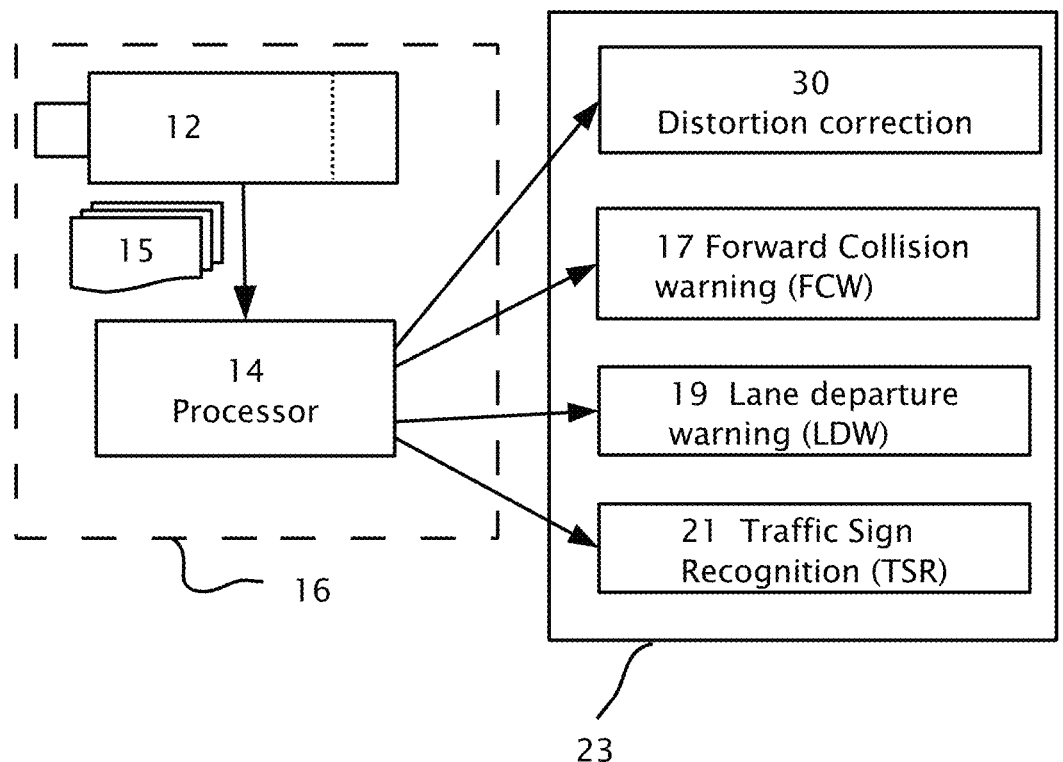

Referring now to the drawings, reference is now made to FIGS. 1 and 2 which illustrate a system 16 including a camera or image sensor 12 with a rolling shutter mountable in a vehicle 18, according to an aspect of the present invention. Image sensor 12, imaging a field of view in the forward direction typically captures in real time a time series of image frames 15. An image processor 14 may be used to process image frames 15 simultaneously and/or in parallel to serve a number of driver assistance and/or control systems. Image sensor 12 may be monochrome or black-white, i.e. without color separation. By way of example in FIG. 2, image frames 15 may be used to serve a monitor/control system 23 which may include collision warning 17, lane departure warning 19, traffic sign recognition (TSR) 21 and structure from motion (SfM) with rolling shutter distortion correction 30 according to embodiments of the present invention. Structure from motion may include for example presenting three dimensional imagery on a display to the driver, measuring distance to objects being imaged or the detection of three dimensional structures including curbs, guard rails, structural barriers, e.g. concrete lane divider. Aspects of the present invention may include exchange of information between SfM 30 and other driver assistance functions and/or systems including but not limited by FCW 17 and LDW 19. For example, a Lane Departure Warning (LDW) 19 as part of warning system 23, may respond more strongly to a lane departure towards a guard rail or a barrier rather than a lane marker or even a white line. A Forward Collision Warning (FCW) system 19 may trigger sooner if the path to either side of in-path vehicle is blocked by a guard rail or another vehicle.

The terms "camera" and "image sensor" are used herein interchangeably. The term "object" as used herein refers to an object in real space being viewed by a camera. A guard rail along the edge of a road and a lane marker in the road are examples of objects. The term "image" refers to the image of one or more objects in image space at the focal plane of camera 12. Image coordinates (x,y) in small letters refer to image space and may be in arbitrary units or numbers of picture elements in the horizontal and vertical directions with the pixel dimensions assumed.

The term "image point" as used herein refers to a point (x,y) in image space. The term "pixel" short for "picture element" and "image point" are used herein interchangeably. The term "corresponding" as used herein in the context of "corresponding" image points refers to image points of different image frames of a time sequence which have been found to be image points of the same object point. The terms "corresponding" image points and "matching" image points are used herein interchangeably.

The term "time stamp" as used herein refers to a point in time relative to a reference time which may be selected during a time sequence of image frames. The term "time stamp" as used herein is a capture time of an image point or image row of the rolling shutter. The time stamp may be further adjusted to correct for another known distortion in the camera other than that caused by the rolling shutter in which case the time stamp used is not strictly the capture time of the image point.

The term "image motion" refers to motion of an image of an object in image space. From image frame 15 to a subsequent image frame 15 the points of the image of the object may map from one set of coordinates (x1,y1) to a different set of coordinates (x2,y2). The term "image motion" refers to the mapping of coordinates of an image from image frame to image frame or a function of the mapping. The term "projection" or "projecting" as used herein refers to camera or perspective projection unless otherwise indicated by the context.

Figure 3:
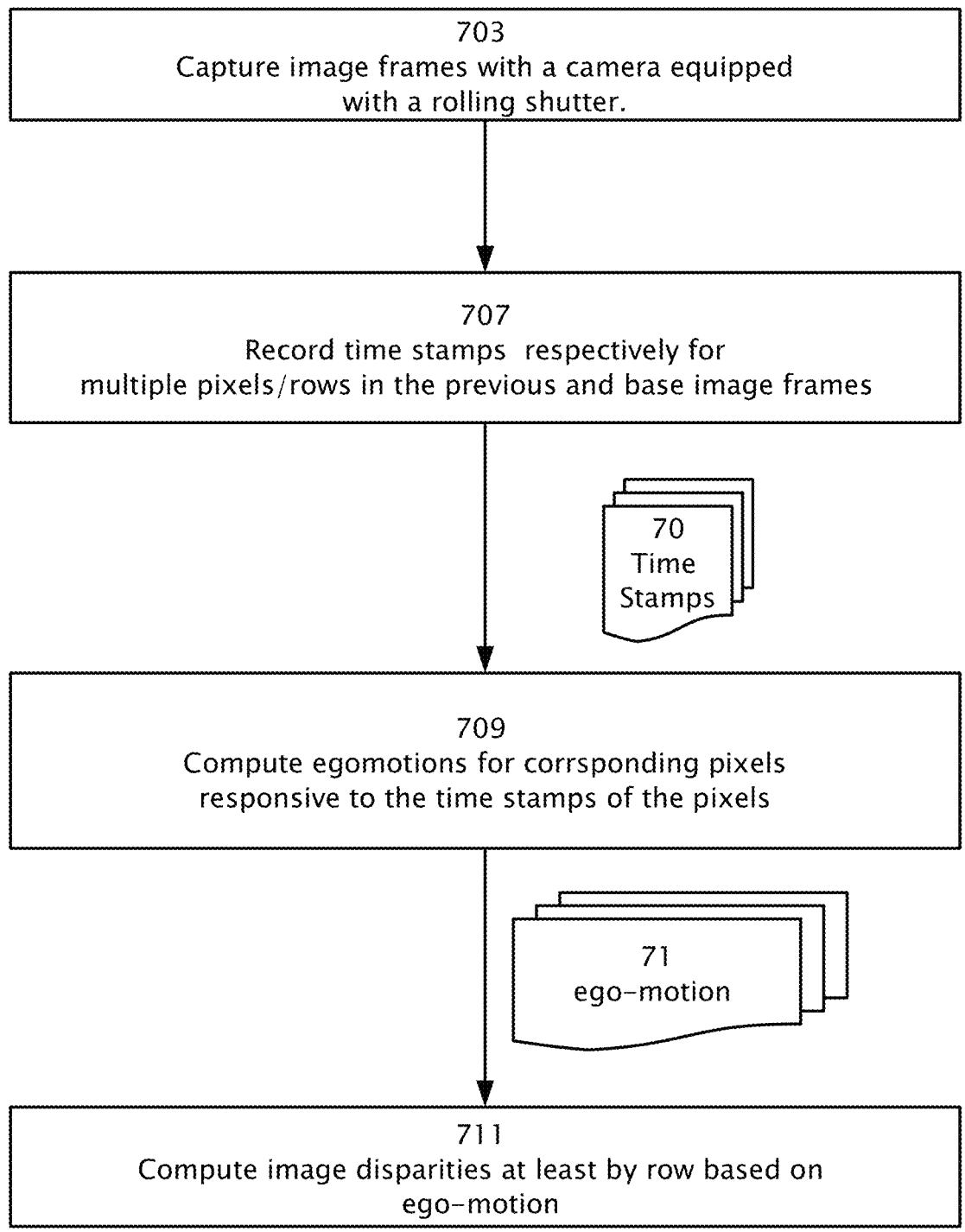
FIG. 3 illustrates a simplified method, according to embodiments of the present invention.

Reference is now also made to FIG. 3 which illustrates a simplified method 30, according to embodiments of the present invention for image distortion correction using a rolling shutter. Image frames are captured (step 703) with a camera equipped with a rolling shutter. Time stamps 70 are recorded (step 707) for multiple rows in the previous and base image frames or for multiple pixels per row in both. In step 709, ego-motion is computed on a row by row or pixel by pixel basis responsive to time stamps 70, and more particularly the ego-motion may be responsive to the difference in time stamps 70 of corresponding pixels in the previous and base image frames. Ego-motion results 71 of the rows and/or of the pixels for corresponding rows and pixels. Ego-motion results may be represented by corrections to a global ego-motion matrix which would be valid for all pixels with the use of a global shutter instead of a rolling shutter. The corrected ego-motion results may be used pixel by pixel or row by row for further image processing such as computation in step 711 of image disparities for providing or displaying structure from motion (SfM). In the description that follows, method 30 is described in further detail with SfM as an example.

As previously stated, an SfM algorithm using a global ego-motion computation assumes that all the pixels in image frame 15 are sampled simultaneously. However, when camera 12 has a rolling shutter, the assumption of simultaneous sampling for all pixels in a single image frame 15 is no longer valid. The rolling shutter therefore produces an image distortion, which affects performance of structure from motion (SfM) algorithm.

A correction to the image distortion may be applied in two stages to the original structure from motion (SfM) algorithm: A. distance estimation correction and B. ego-motion correction.

A. Distance Estimation Correction

The distance correction for the rolling shutter effect of camera 12 is presented here in four main steps. The inputs include the structure from motion (SfM) distance estimation, the ego motion matrix C, time stamps approximation and time difference between the base and previous images. Each of the following steps may be performed for every pixel of the base and previous images; or multiple pixels or multiple rows of the base and previous images:

1. Finding Image Coordinates in the Previous Image

The following equations relate the image coordinates of the base image to the image coordinates of the previous image when the global ego-motion of camera 12 is known.

$$\begin{pmatrix} x \\ y \\ f \end{pmatrix}_b \cdot \frac{Z}{f} = \begin{pmatrix} X \\ Y \\ Z \end{pmatrix}_b$$

$$C^{-1} \begin{pmatrix} X \\ Y \\ Z \\ 1 \end{pmatrix}_b = \begin{pmatrix} X \\ Y \\ Z \\ 1 \end{pmatrix}_p$$

$$\begin{pmatrix} X \\ Y \\ Z \end{pmatrix}_p \cdot \frac{f}{Z_p} = \begin{pmatrix} x \\ y \\ f \end{pmatrix}_p = x_p$$

where b refers to base image and p refers to the previous image, x,y are image coordinates, f is the focal length of camera 12 and X,Y,Z are real-space Cartesian coordinates of the object point being imaged relative to the camera coordinates. X is the horizontal coordinate, Y is the vertical coordinate and Z is the distance to the object in the forward direction. C is an ego-motion matrix under the assumption of a global shutter.

$C^{-1}$ is the inverse of ego-motion matrix C.

2. Correcting the Ego Motion Matrix

The input C is the ego motion matrix that describes the real-space motion of camera 12 while capturing the previous and base image frames 15 when the rolling shutter effect is not taken into account. In other words, ego motion matrix C describes the hypothetical situation in which camera 12 does not have a rolling shutter and all the pixels are simultaneously sampled. The term "simultaneous" abbreviated as "sim" is used to describe the situation when all the pixels are sampled simultaneously. So the ego motion matrix C describes ego-motion from previous-sim image to base-sim image. The term "rolling shutter", abbreviated "RS" is used to describe the situation when all the pixels are not sampled exactly at the same moment or not sampled simultaneously, i.e camera 12 has a rolling shutter.

In order to correct the effect of the rolling shutter, the ego motion from previous-RS image frame 15 to base-RS image frame 15 is used. Let the desired ego motion matrix be denoted $C_d$. Given that the time difference between the previous and base images is dt, we obtain the following expression for the desired ego-motion matrix $C_d$:

$$C_d = C^{1+\epsilon} = C^{1+\frac{t_b-t_p}{dt}}$$

where $t_b$ and $t_p$ are the base point and previous point's time stamps respectively.

To obtain a representation of the time stamp of a pixel, a polynomial approximation may be used of ego-motion variation due to the rolling shutter. The power of the ego motion matrix C is calculated approximately, using a first order Taylor expansion. The first order Taylor expansion is linear where approximation of $C^\epsilon$, for $\epsilon$ is small, yields the following result:

$$C^\epsilon \approx \begin{pmatrix} I + \epsilon \log R & \epsilon \frac{\log R}{R-I} t \\ 0 & 1 \end{pmatrix}$$

$$C = \begin{pmatrix} R & t \\ 0 & 1 \end{pmatrix}$$

where R is a rotation matrix and I is an identity matrix.

3. Calculating Distance Considering Rolling Shutter Effect

The distance is recalculated in the following way:

1. The previous coordinates $x_p, y_p$ of the previous image frame are rotated to match the base coordinate $x_b, y_b$ of the base image frame so that camera 12 recording the previous image and camera 12 recording the base image are parallel and have the same focus of expansion (FOE)).

2. The focus of expansion FOE is calculated by the following equation:

$$FOE(x, y) = (t_x, t_y)\frac{f}{t_z}$$

where $t_x, t_y, t_z$ are the translation vector components.

3. The disparity, d, is calculated: $d = r_b - r_p$, where $r_b$ is the distance from the pixel to the FOE in the base image and $r_p$ is the same for the previous image.

4. Finally, the distance is calculated:

$$Z_{new} = \frac{-t_z \cdot r_p}{d}$$

4. Final Correction of the Distance

By now the exact distance $Z_{new}$ to each object point imaged by an image point in the base image may be obtained, in real time, which is the real distance at the exact moment in which the image point was recorded. The real distance to each object point imaged by an image point in the exact moment in which the image point was recorded is not the distance sought. Instead it is desired to cancel the effect of the rolling shutting while camera 12 is moving d. What is needed is the distance obtained if camera 12 had no rolling shutter. To get the distance if camera 12 had no rolling shutter, the time stamp of the base pixel is used, to get the following ego motion matrix under assumption of the rolling shutter:

$$C^{\frac{-t_b}{dt}}$$

Multiplying the ego motion matrix in the new base world point found, gets the final world point and the desired distance from it. The corrected ego motion matrices under assumption of the rolling shutter may be used in equations of section A1 to determine the previous image coordinates. The previous image coordinates may be used to determine the distances and disparities under assumption of a rolling shutter from the equations in section A3 above.

B. Ego Motion Estimation Correction

As stated previously, the original structure from motion (SfM) algorithm includes a stage in which the ego motion matrix C is calculated. As explained in the previous section, in the presence of rolling shutter distortions, the matrix which describes the camera 12 movement from previous-RS to base-RS would be $C^\alpha$, where the ego motion matrix C is the camera matrix from previous-sim image to base-sim image is:

$$\alpha = 1 + \epsilon = 1 + \frac{t_b - t_p}{dt}$$

and therefore $\epsilon$ is small. In essence, the rolling shutter effect correction is applied to this stage by replacing the ego motion matrix C with $C^\alpha$ pixel by pixel or row by row and adjusting all the equations previously presented accordingly.

Ego Motion Estimation in the Structure from Motion (SfM) Algorithm

In order to find the ego motion matrix, the structure from motion (SfM) algorithm uses an iterative process where the optimization goal is to minimize the distances between the epipolar lines corresponding to the previous points and the matching base points. Each iteration includes the following steps:

1. Both cameras 12 (previous and base camera 12 orientations) are rotated so that the line connecting their centers would be perpendicular to both image planes. This rotation is done assuming that the matrix $R_p$ and translation vector $t_p$ obtained in the previous iteration (or given as the initial guess) describe the motion from previous to base.

2. In this position the new rotation matrix would be approximately I and the translation vector would be close to:

$$(0\ 0\ -1)^T$$

Thus, after the rotation is done in the first step, the rotation matrix and translation vector between the cameras may be written as:

$$R = I + \Delta = \begin{pmatrix} 1 & -r & y \\ r & 1 & p \\ -y & -p & 1 \end{pmatrix}$$

and $$t = \begin{pmatrix} a \\ b \\ -1 \end{pmatrix}$$

where r, y, p, a, b are unknown parameters assumed to be small.

3. Let v be a point in the base image, and let u be the corresponding point in the previous image (these points are the result of an earlier point matching stage). Let ṽ and ũ be these points in the coordinate systems of the rotated cameras (step B1). The distance between v and the epipolar line determined by ũ is:

$$D = \frac{\tilde{v}^T t_x R \tilde{u}}{\sqrt{w_1^2 + w_2^2}}$$

where $$w = t_x R u = (w_1\ w_2\ w_3)^T$$

D=0 is an equation with five unknowns (r, y, p, a, b); so there are as many such equations as the number of point pairs. Neglecting second-order terms, new R and t are obtained by solving a system of linear equations.

Rolling Shutter Distortion Correction

Having no rolling shutter effects, the ego motion matrix from base image to previous image is:

$$C = \begin{pmatrix} \tilde{R}_2^{-1} & 0 \\ 0 & 1 \end{pmatrix} P \begin{pmatrix} \tilde{R}_1 & 0 \\ 0 & 1 \end{pmatrix}$$

where the first and last matrices describe the rotation of the cameras back to their original position, $$P = t_x R = \begin{pmatrix} I + \Delta & \begin{pmatrix} a \\ b \\ -1 \end{pmatrix} \\ 0 & 1 \end{pmatrix}$$

and translation vector t and rotation matrix R describe the motion between the parallel cameras-after step B1).

Considering the rolling shutter effect, the corrected ego motion matrix would be $$C^\alpha = \begin{pmatrix} \tilde{R}_2^{-1} & 0 \\ 0 & 1 \end{pmatrix} P_\alpha \begin{pmatrix} \tilde{R}_1 & 0 \\ 0 & 1 \end{pmatrix}$$

and thus:

$$P_\alpha = t_\alpha \times R_\alpha = \begin{pmatrix} \tilde{R}_2 & 0 \\ 0 & 1 \end{pmatrix} C^\alpha \begin{pmatrix} \tilde{R}_1^{-1} & 0 \\ 0 & 1 \end{pmatrix}$$

Expanding this expression and using first order Taylor expansions gives the corrected expressions for the translation and rotation matrices, and a new equation (D=0) with the same five unknowns is obtained, only here it incorporates the time stamp difference between pixels caused by the rolling shutter.

The indefinite articles "a" and "an" is used herein, such as "a camera", "an image frame" have the meaning of "one or more" that is "one or more cameras" or "one or more image frames".

Although selected embodiments of the present invention have been shown and described, it is to be understood the present invention is not limited to the described embodiments. Instead, it is to be appreciated that changes may be made to these embodiments, the scope of which is defined by the claims and the equivalents thereof.

I claim:

1. A method for correcting for image distortion during camera motion using a system including a processor and a camera having a rolling shutter, the method comprising:
   representing the camera motion by an ego-motion matrix;
   capturing a plurality of image frames by the camera equipped with the rolling shutter, wherein the captured image frames include a base image frame and a previous image frame;
   recording a plurality of time stamps respectively for a plurality of corresponding image points in the previous and base image frames; and
   computing a plurality of ego-motions between capture times of the corresponding image points by correcting the ego-motion matrix responsive to the time stamps of the corresponding image points of the base image frame and the previous image frame thereby correcting for the image distortion caused by the rolling shutter.

2. The method of claim 1, wherein said computing said ego-motions is performed using image data from the image frames of the camera.

3. The method of claim 1, wherein the corresponding image points of the base image frame and the previous image frame are image points of the same object point.

4. The method of claim 1, wherein said computing said ego-motions is responsive to the time stamp difference between the corresponding image points.

5. The method of claim 1, further comprising:
computing image disparities based on the ego-motions.

6. The method of claim 1, further comprising:
computing distance to an object being imaged based on the ego-motions.

7. The method of claim 1, further comprising:
determining the ego-motions by using an iterative process wherein an optimization goal is to minimize the distances between the epipolar lines corresponding to the image points in the previous image and the matching image points in the base image.

8. A system configured to correct for image distortion during camera motion, the system comprising:
a processor; and a camera operatively connected to the processor wherein the camera has a rolling shutter;
wherein the processor is configured to represent the camera motion by an ego-motion matrix;
wherein the processor is configured to capture a plurality of image frames by the camera equipped with the rolling shutter, wherein the captured image frames include a base image frame and a previous image frame;
wherein the processor is configured to record a plurality of time stamps respectively for a plurality of corresponding image points in the previous and base image frames; and
wherein the processor is configured to compute a plurality of ego-motions between capture times of the corresponding image points by correcting the ego-motion matrix responsive to the time stamps of the corresponding image points of the base image frame and the previous image frame to correct for the image distortion caused by the rolling shutter.

9. The system of claim 8, wherein said processor is further configured to compute the ego-motions from image data from the image frames of the camera.

10. The system of claim 8, wherein the corresponding image points of the base image frame and the previous image frame are image points of the same object point.

11. The system of claim 8, wherein the computation of the ego-motions is responsive to the time stamp difference between the corresponding image points.

12. The system of claim 8, wherein said processor is further configured to
compute image disparities based on the ego-motions.

13. The system of claim 8, wherein said processor is further configured to
compute distance to an object being imaged based on the ego-motions.

14. The system of claim 8, wherein said processor is further configured to
determine the ego-motions by using an iterative process, wherein an optimization goal is to minimize the image distances between the epipolar lines corresponding to the image points in the previous image and the matching image points in the base image.

* * * * *